US012798703B2

(12) United States Patent
Fu et al.

(10) Patent No.: US 12,798,703 B2
(45) Date of Patent: Nov. 17, 2026

(54) VEHICLE OPERATION MODES FOR VEHICLES CAPABLE OF WHEELED AND WALKING MOTION

(71) Applicants: Hyundai Motor Company, Seoul (KR); Kia Corporation, Seoul (KR)

(72) Inventors: Ernestine Fu, Somerville, MA (US); Daniel Chan, Sunnyvale, CA (US); Zachary Nobles, Superior Township, MI (US); John Suh, Palo Alto, CA (US); Alec Taraborrelli, Superior Township, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 351 days.

(21) Appl. No.: 18/420,252

(22) Filed: Jan. 23, 2024

(65) Prior Publication Data

US 2025/0236350 A1 Jul. 24, 2025

(51) Int. Cl.

| | |
|---|---|
| ***B62D 57/028*** | (2006.01) |
| ***B62D 6/00*** | (2006.01) |
| ***B62D 57/02*** | (2006.01) |
| *B60L 15/34* | (2006.01) |

(52) U.S. Cl.

CPC ........... *B62D 57/028* (2013.01); *B62D 6/007* (2013.01); *B62D 57/022* (2013.01); *B60L 15/34* (2013.01); *B60L 2240/12* (2013.01); *B60L 2240/32* (2013.01); *B60L 2260/40* (2013.01)

(58) Field of Classification Search

CPC .... B62D 57/028; B62D 6/007; B62D 57/022; B60L 15/34; B60L 2240/12; B60L 2240/32; B60L 2260/40; B60W 20/00; B60W 60/00; B60W 30/182

See application file for complete search history.

(56) References Cited

U.S. PATENT DOCUMENTS

| | | | | |
|---|---|---|---|---|
| 7,588,105 | B2 * | 9/2009 | Hillis | B62D 57/022 180/7.1 |
| 10,640,159 | B2 * | 5/2020 | Bliss | B62D 55/075 |
| 2019/0210225 | A1 * | 7/2019 | Hong | B25J 5/007 |
| 2020/0216127 | A1 * | 7/2020 | Suh | B25J 18/02 |
| 2021/0276642 | A1 * | 9/2021 | Gillett | B25J 5/007 |
| 2021/0283783 | A1 * | 9/2021 | Gillett | G05D 1/0088 |
| 2024/0336313 | A1 * | 10/2024 | Cho | B60G 17/015 |
| 2025/0145233 | A1 * | 5/2025 | Kamon | B62D 57/028 |

* cited by examiner

*Primary Examiner* — Kevin Hurley
*Assistant Examiner* — Marlon A Arce
(74) *Attorney, Agent, or Firm* — Fox Rothschild LLP

(57) ABSTRACT

Systems and methods for operating a hybrid vehicle are provided. The hybrid vehicle may comprise a processor, a chassis, and a plurality of leg-wheel components coupled to the chassis. The plurality of leg-wheel components may be configured to be collectively operable to provide wheeled locomotion and walking locomotion. The processor may be configured to cause the hybrid vehicle to function in one or more of a plurality of modes of operation. Each mode of operation, in the plurality of modes of operation, is configured to delegate control of an operation of at least one aspect of the hybrid vehicle between an operator and the processor.

18 Claims, 11 Drawing Sheets

300

400

| | OPERATOR MODE 1 | OPERATOR MODE 2 | OPERATOR MODE 3 | OPERATOR MODE 4 | OPERATOR MODE 5 | OPERATOR MODE 6 |
|---|---|---|---|---|---|---|
| OBJECTIVES | OPERATOR | OPERATOR | OPERATOR | OPERATOR | OPERATOR | FLEET OPERATOR |
| DESTINATION | OPERATOR | OPERATOR | OPERATOR | OPERATOR | VEHICLE | VEHICLE |
| SPEED AND DIRECTION OF TRAVEL | OPERATOR | OPERATOR | OPERATOR | VEHICLE | VEHICLE | VEHICLE |
| LOCOMOTION MODE (WALKING, WHEELED, COMBO) | OPERATOR | OPERATOR | VEHICLE | VEHICLE | VEHICLE | VEHICLE |
| MOTOR POSITIONS OF WHEEL-LEG COMPONENTS | OPERATOR | VEHICLE | VEHICLE | VEHICLE | VEHICLE | VEHICLE |

FIG. 4

VEHICLE OPERATION MODES FOR VEHICLES CAPABLE OF WHEELED AND WALKING MOTION

BACKGROUND

Technical Field

Embodiments of the present disclosure relate to systems and methods for controlling a vehicle capable of locomotion using both walking motion and rolling traction.

Background

Conventional passenger motor vehicles are designed to primarily move in a forward direction using wheeled locomotion. These conventional motor vehicles are typically controlled using a steering wheel to control the direction of travel of the vehicle and two (or three) foot pedals to control acceleration and braking (and shifting gears in a manual transmission). While innovation in the automobile industry has changed the driving experience, control of vehicles using a steering wheel and standard foot pedals has not fundamentally changed since the mass-production of automobiles.

New motor vehicles capable of wheeled and walking motion, such as, e.g., the Hyundai Elevate, will be capable of omnidirectional movement (e.g., being able to perform in a walking mode). Current user interfaces for controlling conventional motor vehicles are not able to provide control for such new vehicles. With the advent of an automobile capable of omnidirectional travel (e.g., a walking vehicle), driving controls must be reimagined to provide operator control of the new vehicular functionality.

SUMMARY

According to an object of the present disclosure, a hybrid vehicle is provided. The hybrid vehicle may comprise a processor, a chassis, and a plurality of leg-wheel components coupled to the chassis. The plurality of leg-wheel components may be configured to be collectively operable to provide wheeled locomotion and walking locomotion. The processor may be configured to cause the hybrid vehicle to function in one or more of a plurality of modes of operation.

In particular aspects, one or more (such as 1, 2, 3, 4, 5 or 6) modes of operation or preferably each mode of operation, in the plurality of modes of operation, may be configured to delegate control of an operation of at least one aspect of the hybrid vehicle between an operator and the processor. In particular methods and systems, one or more (such as 1, 2, 3, 4, 5 or 6) or preferably each mode of operation, in the plurality of modes of operation, has delegated control of an operation of at least one aspect of the hybrid vehicle between an operator and the processor.

According to an exemplary embodiment, the at least one aspect of the hybrid vehicle may comprise one or more of the following: an objective of the hybrid vehicle; a destination of the hybrid vehicle; a speed of the hybrid vehicle; a direction of travel of the hybrid vehicle; a type of locomotion of the hybrid vehicle; and a position of the plurality of leg-wheel components of the hybrid vehicle.

According to an exemplary embodiment, the plurality of modes of operation may comprise a first mode of operation, and, during the first mode of operation, the operator controls: the objective of the hybrid vehicle; the destination of the hybrid vehicle; the speed of the hybrid vehicle the direction of travel of the hybrid vehicle; the type of locomotion of the hybrid vehicle; and the position of the plurality of leg-wheel components of the hybrid vehicle.

According to an exemplary embodiment, the plurality of modes of operation may comprise a second mode of operation, and, during the second mode of operation: the operator controls:

the objective of the hybrid vehicle; the destination of the hybrid vehicle; the speed of the hybrid vehicle; the direction of travel of the hybrid vehicle; and the type of locomotion of the hybrid vehicle, and the processor controls: the position of the plurality of leg-wheel components of the hybrid vehicle.

According to an exemplary embodiment, the plurality of modes of operation may comprise a third mode of operation, and, during the third mode of operation: the operator controls: the objective of the hybrid vehicle; the destination of the hybrid vehicle; the speed of the hybrid vehicle; and the direction of travel of the hybrid vehicle, and the processor controls: the type of locomotion of the hybrid vehicle; and the position of the plurality of leg-wheel components of the hybrid vehicle.

According to an exemplary embodiment, the plurality of modes of operation may comprise a fourth mode of operation, and, during the fourth mode of operation: the operator controls: the objective of the hybrid vehicle; and the destination of the hybrid vehicle, and the processor controls: the speed of the hybrid vehicle; the direction of travel of the hybrid vehicle; the type of locomotion of the hybrid vehicle; and the position of the plurality of leg-wheel components of the hybrid vehicle.

According to an exemplary embodiment, the plurality of modes of operation may comprise a fifth mode of operation, and, during the fifth mode of operation: the operator controls: the objective of the hybrid vehicle, and the processor controls: the destination of the hybrid vehicle; the speed of the hybrid vehicle; the direction of travel of the hybrid vehicle; the type of locomotion of the hybrid vehicle; and the position of the plurality of leg-wheel components of the hybrid vehicle.

According to an exemplary embodiment, the plurality of modes of operation may comprise a sixth mode of operation, and, during the sixth mode of operation: a fleet operator controls: a plurality of hybrid vehicles, wherein each of the plurality of hybrid vehicles are configured to be capable of wheeled and walking motion; and the objective of the hybrid vehicle, and the processor controls: the destination of the hybrid vehicle; the speed of the hybrid vehicle; the direction of travel of the hybrid vehicle; the type of locomotion of the hybrid vehicle; and the position of the plurality of leg-wheel components of the hybrid vehicle.

According to an object of the present disclosure, a system for controlling a hybrid vehicle is provided. The system may comprise a hybrid vehicle. The hybrid vehicle may comprise a chassis and a plurality of leg-wheel components coupled to the chassis. The plurality of leg-wheel components may be configured to be collectively operable to provide wheeled locomotion and walking locomotion. The system may further comprise a computing device. The computing device may comprise a processor and a memory. The memory may configured to store programming instructions that, when executed by the processor, cause the processor to cause the hybrid vehicle to function in one or more of a plurality of modes of operation.

As discussed, in preferred aspects, one or more or preferably each mode of operation, in the plurality of modes of operation, may be configured to delegate control of an operation of at least one aspect of the hybrid vehicle between an operator and the hybrid vehicle.

According to an exemplary embodiment, the at least one aspect of the hybrid vehicle may comprise one or more of the following: an objective of the hybrid vehicle; a destination of the hybrid vehicle; a speed of the hybrid vehicle; a direction of travel of the hybrid vehicle; a type of locomotion of the hybrid vehicle; and a position of the plurality of leg-wheel components of the hybrid vehicle.

According to an exemplary embodiment, the plurality of modes of operation may comprise a first mode of operation, and, during the first mode of operation, the operator controls the objective of the hybrid vehicle; the destination of the hybrid vehicle; the speed of the hybrid vehicle; the direction of travel of the hybrid vehicle; the type of locomotion of the hybrid vehicle; and the position of the plurality of leg-wheel components of the hybrid vehicle.

According to an exemplary embodiment, the plurality of modes of operation may comprise a second mode of operation, and, during the second mode of operation: the operator controls: the objective of the hybrid vehicle; the destination of the hybrid vehicle; the speed of the hybrid vehicle; the direction of travel of the hybrid vehicle; and the type of locomotion of the hybrid vehicle, and the processor controls: the position of the plurality of leg-wheel components of the hybrid vehicle.

According to an exemplary embodiment, the plurality of modes of operation comprises a third mode of operation, and, during the third mode of operation: the operator controls: the objective of the hybrid vehicle; the destination of the hybrid vehicle; the speed of the hybrid vehicle; and the direction of travel of the hybrid vehicle, and the hybrid vehicle controls: the type of locomotion of the hybrid vehicle; and the position of the plurality of leg-wheel components of the hybrid vehicle.

According to an exemplary embodiment, the plurality of modes of operation comprises a fourth mode of operation, and, during the fourth mode of operation: the operator controls: the objective of the hybrid vehicle; and the destination of the hybrid vehicle, and the hybrid vehicle controls: the speed of the hybrid vehicle; the direction of travel of the hybrid vehicle; the type of locomotion of the hybrid vehicle; and the position of the plurality of leg-wheel components of the hybrid vehicle.

According to an exemplary embodiment, the plurality of modes of operation may comprise a fifth mode of operation, and, during the fifth mode of operation: the operator controls: the objective of the hybrid vehicle, and the hybrid vehicle controls: the destination of the hybrid vehicle; the speed of the hybrid vehicle; the direction of travel of the hybrid vehicle; the type of locomotion of the hybrid vehicle; and the position of the plurality of leg-wheel components of the hybrid vehicle.

According to an exemplary embodiment, the plurality of modes of operation comprises a sixth mode of operation, and, during the sixth mode of operation: a fleet operator controls: a plurality of hybrid vehicles, wherein each of the plurality of hybrid vehicles are configured to be capable of wheeled and walking motion; and the objective of the hybrid vehicle, and the hybrid vehicle controls: the destination of the hybrid vehicle; the speed of the hybrid vehicle; the direction of travel of the hybrid vehicle; the type of locomotion of the hybrid vehicle; and the position of the plurality of leg-wheel components of the hybrid vehicle.

According to an exemplary embodiment, the system may further comprise the plurality of hybrid vehicles.

According to further aspects, methods for controlling a hybrid vehicle are provided. In one aspect, the method may comprise setting, using a processor, a mode of operation, of a plurality of modes of operation. Each mode of operation, in the plurality of modes of operation, may be configured to delegate control of an operation of at least one aspect of a hybrid vehicle between an operator and the hybrid vehicle. The hybrid vehicle may comprise a chassis and a plurality of leg-wheel components coupled to the chassis. The plurality of leg-wheel components may be configured to be collectively operable to provide wheeled locomotion and walking locomotion. The method suitably may comprise causing the hybrid vehicle to function in one or more of the plurality of modes of operation.

BRIEF DESCRIPTION OF THE DRAWINGS

The accompanying drawings, which are incorporated in and form a part of the Description of Embodiments, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

FIG. 4 is a chart illustrating a plurality of modes of operation of a mobility vehicle, according to exemplary embodiments of the present disclosure.

DETAILED DESCRIPTION

Figure 1A:
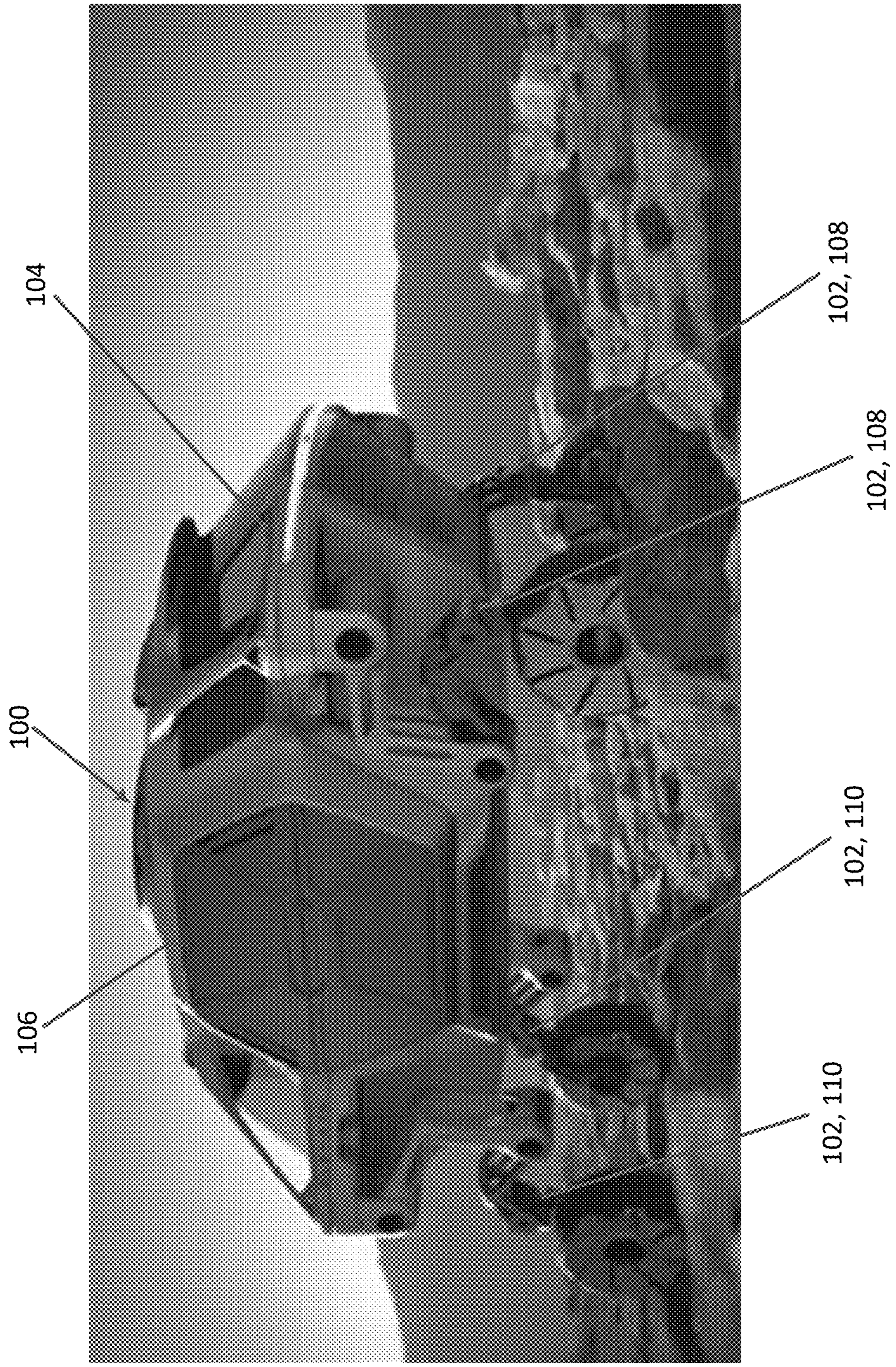
FIGS. 1A through 1C illustrate a hybrid vehicle capable of omnidirectional movement using both walking motion and rolling motion, according to an exemplary embodiment of the present disclosure.

The following Description of Embodiments is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating," "estimating," "initiating," "providing," "receiving," "controlling," "transmitting," "isolating," "generating," "aligning," "synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package," an Integrated Circuit (IC).

Embodiments described herein provide a different vehicle operation modes for a vehicle capable of locomotion using both walking motion and rolling traction, also referred to herein as a "hybrid vehicle."

According to an exemplary embodiment, an operator of a hybrid vehicle may be provided with one or more different degrees of vehicular control. The one or more different degrees of vehicular control may be based, e.g., on the operator's experience, a vehicle objective, a type of types of terrain to be traversed, a condition of the hybrid vehicle, a number of hybrid vehicles in a fleet, etc. For example, the different vehicle operation modes may range from a complete manual operation mode of an onboard operator to a remote control mode used for control of a fleet of hybrid vehicles.

According to an exemplary embodiment, in controlling the operation of a hybrid vehicle as described herein, a number of aspects of the operation are subject to different types of operator control. For example, aspects that can be controlled in operating a hybrid vehicle may comprise one or more objectives of the hybrid vehicle, a destination of the hybrid vehicle, a speed and direction of travel of the hybrid vehicle, a type of locomotion used (e.g., wheeled, walking, or a combination) by the hybrid vehicle, a position of one or more legs when the hybrid vehicle is using walking locomotion, controlling the walking gait when in walking locomotion, etc.

Moreover, in controlling the operation of a mobility vehicle, different vehicle operation modes are described that may afford different types of operation to the hybrid vehicle operator. In general, the vehicle operation modes may cover modes in which an onboard operator is in complete control of vehicle operation to modes in which an operator (onboard or remote) may provide the hybrid vehicle with one or more objectives that the hybrid vehicle may interpret, which the hybrid vehicle may then implement to accomplish the one or more objectives.

Figure 1B:
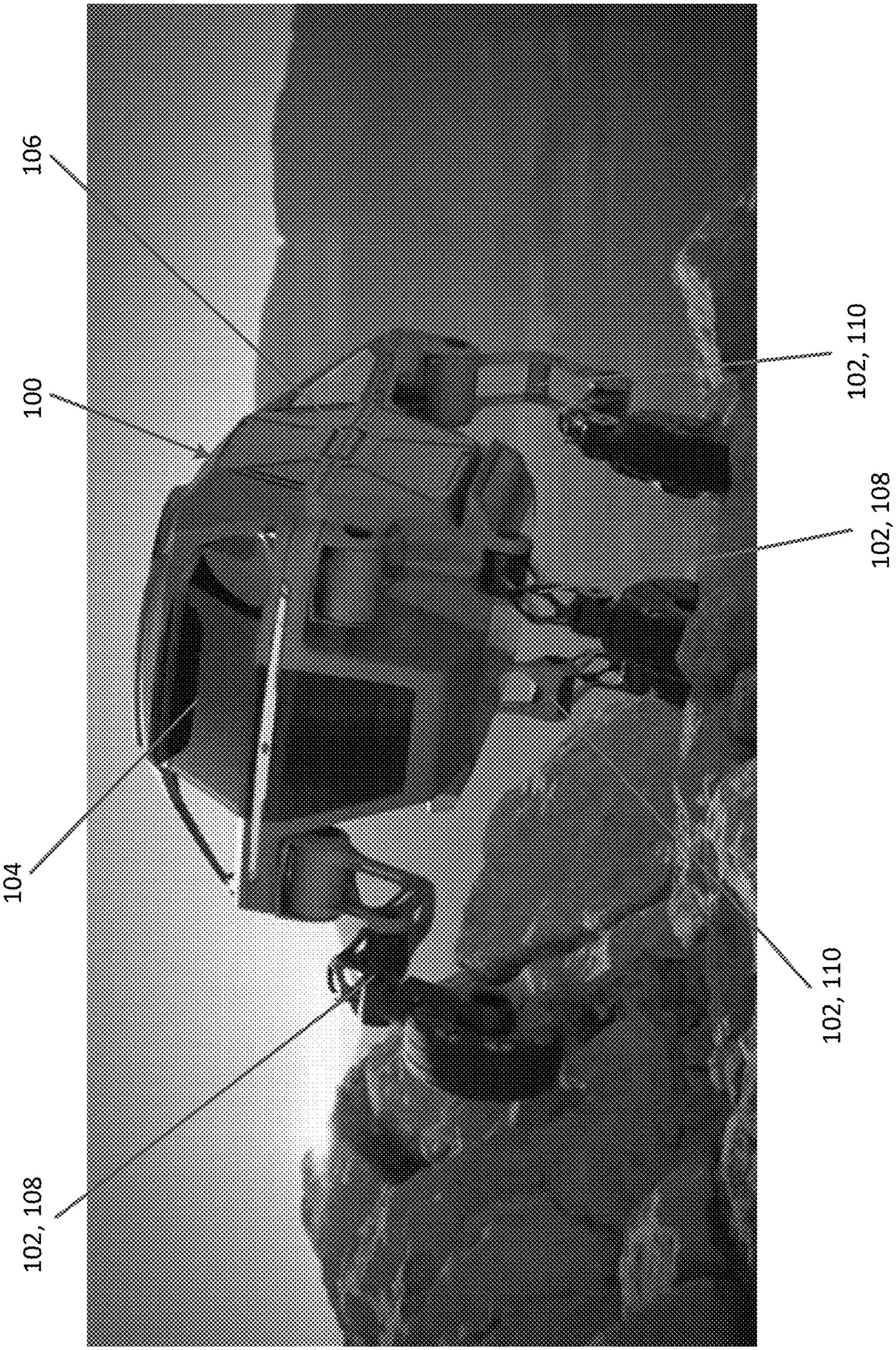
Figure 1C:
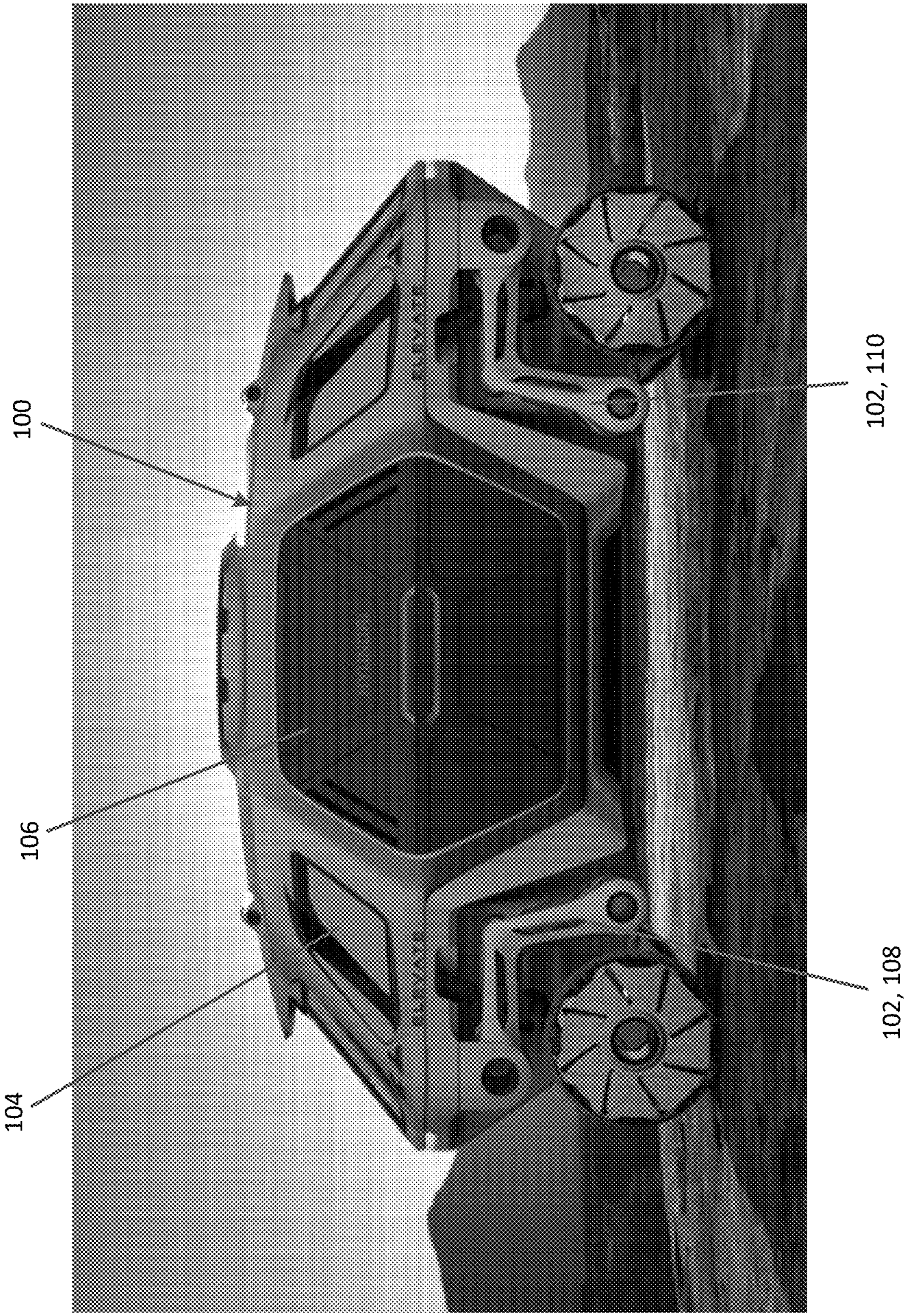

Referring now to FIGS. 1A through 1C, a hybrid vehicle 100 capable of, and configured to perform, omnidirectional movement using both walking motion and rolling motion, is illustratively depicted, according to exemplary embodiments of the present disclosure. FIGS. 1A and 1B illustrate the hybrid vehicle 100 in different walking locomotion positions across rugged terrain, where hybrid vehicle 100 is capable of omnidirectional movement. FIG. 1C illustrates a side view of hybrid vehicle 100.

Hybrid vehicle 100 may comprise four leg-wheel components 102, each configured to perform movement with at least two degrees of freedom. It is noted, however, that other numbers of leg-wheel components 102 may be incorporated, while maintaining the spirit and functionality of the present disclosure. As illustrated, hybrid vehicle 100 may comprise a passenger compartment 104 configured to hold one or more people. It should be appreciated that hybrid vehicle 100, in some exemplary embodiments, may be configured to be operated by an onboard operator, may be configured to be operated remotely, and/or may be configured to be operated autonomously.

In an exemplary embodiment, the leg-wheel components 102 may be configured to perform movement with at least six degrees of freedom. It should be appreciated that, while the leg-wheel components 102 may be configured to be controlled collectively in order to provide rolling and walking locomotion, each leg-wheel component 102 may be capable of performing different movement or positioning, from the one or more other lag-wheel components 102, during operation. For example, while using wheeled locomotion on an upward slope, in order to maintain a body 114 and chassis 106 of the hybrid vehicle 100 level with flat ground, the front leg-wheel components 108 may be retracted and the rear leg-wheel components 110 may be extended. In an exemplary embodiment, while using walking locomotion to traverse rough terrain, each leg-wheel component 102, or opposite pairs of the leg-wheel components 102 (e.g., front left and rear right), may be configured to move differently from the other leg-wheel components 102. The leg-wheel components 102 may be configured to operate to move the hybrid vehicle 100 in any direction of travel, and may be configured to change direction(s) at any time.

According to an exemplary embodiment, the hybrid vehicle 100 may be configured to move according to one or more modes of operation. According to an exemplary embodiment, each mode of operation, of the plurality of modes of operation, may be configured to delegate control of an operation of at least one aspect of the hybrid vehicle between an operator and the hybrid vehicle 100.

Figure 5:
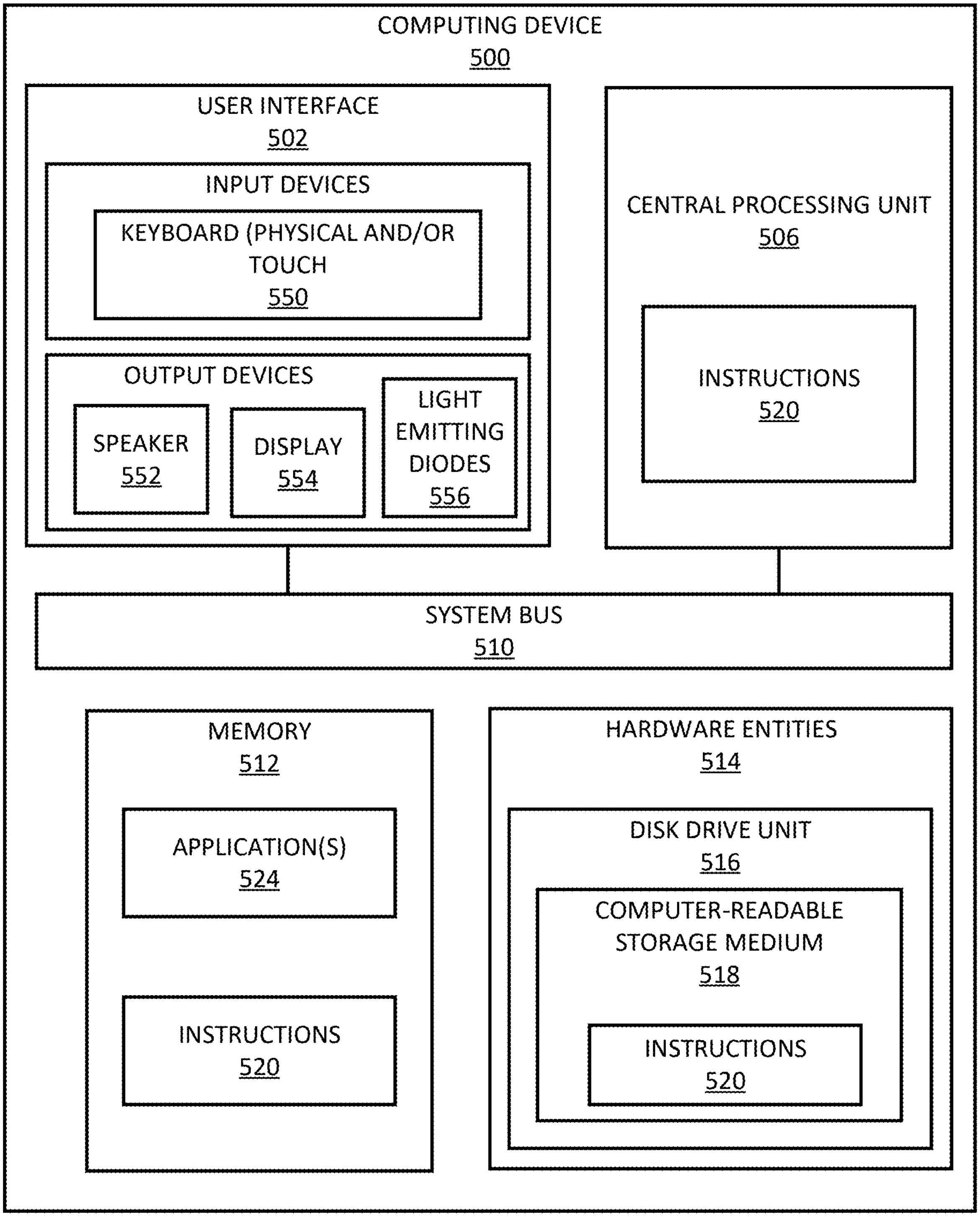
FIG. 5 illustrates example elements of a computing device, according to an exemplary embodiment of the present disclosure.

According to an exemplary embodiment, the hybrid vehicle 100 may comprise and/or be in electronic communication with one or more computing devices (e.g., computing device 500 of FIG. 5). The one or more computing devices may be configured to delegate control of an operation of at least one aspect of the hybrid vehicle between an operator and the hybrid vehicle 100 (via, e.g., the computing device and/or processor of the hybrid vehicle 100) according to one or more of the plurality of modes of operation. According to an exemplary embodiment, a fleet operator may be used to control a plurality of hybrid vehicles 100. According to an exemplary embodiment, each mode of operation may be configured to delegate control of an operation of at least one aspect of the hybrid vehicle 100 between an operator and the hybrid vehicle 100. According to an exemplary embodiment, the hybrid vehicle 100 and/or the operator may be configured to set one or more modes of operation of the plurality of modes of operation.

According to an exemplary embodiment, the at least one aspect of the hybrid vehicle 100 may comprise an objective of the hybrid vehicle 100, a destination of the hybrid vehicle 100, a speed of the hybrid vehicle 100, a direction of travel of the hybrid vehicle, a type of locomotion of the hybrid vehicle 100, and a position of the plurality of leg-wheel components 102 of the hybrid vehicle 100.

According to an exemplary embodiment, the plurality of modes of operation may comprise a first mode of operation and, during the first mode of operation, the delegation may be such that the operator may be configured to controls the objective of the hybrid vehicle 100, the destination of the hybrid vehicle 100, the speed of the hybrid vehicle 100, the direction of travel of the hybrid vehicle 100, the type of locomotion of the hybrid vehicle 100, and the position of the plurality of leg-wheel components 102 of the hybrid vehicle 100.

According to an exemplary embodiment, the plurality of modes of operation may comprise a second mode of operation and, during the second mode of operation, the delegation may be such that the operator may be configured to controls the objective of the hybrid vehicle 100, the destination of the hybrid vehicle 100, the speed of the hybrid vehicle 100, the direction of travel of the hybrid vehicle 100, and the type of locomotion of the hybrid vehicle 100, and the hybrid vehicle 100 may be configured to control the position of the plurality of leg-wheel components 102 of the hybrid vehicle 100.

According to an exemplary embodiment, the plurality of modes of operation may comprise a third mode of operation and, during the third mode of operation, the delegation may be such that the operator may be configured to control the objective of the hybrid vehicle 100, the destination of the hybrid vehicle 100, the speed of the hybrid vehicle 100, and the direction of travel of the hybrid vehicle 100, and the hybrid vehicle 100 may be configured to control the type of locomotion of the hybrid vehicle 100, and the position of the plurality of leg-wheel components 102 of the hybrid vehicle 100.

According to an exemplary embodiment, the plurality of modes of operation may comprise a fourth mode of operation and, during the fourth mode of operation, the delegation may be such that the operator may be configured to control the objective of the hybrid vehicle 100 and the destination of the hybrid vehicle 100, and the hybrid vehicle 100 may be configured to control the speed of the hybrid vehicle 100, the direction of travel of the hybrid vehicle 100, the type of locomotion of the hybrid vehicle 100, and the position of the plurality of leg-wheel components 102 of the hybrid vehicle 100.

According to an exemplary embodiment, the plurality of modes of operation may comprise a fifth mode of operation and, during the fifth mode of operation, the delegation may be such that the operator may be configured to control the objective of the hybrid vehicle 100, and the hybrid vehicle 100 may be configured to control the destination of the hybrid vehicle 100, the speed of the hybrid vehicle 100, the direction of travel of the hybrid vehicle 100, the type of locomotion of the hybrid vehicle 100, and the position of the plurality of leg-wheel components 102 of the hybrid vehicle 100.

According to an exemplary embodiment, the plurality of modes of operation may comprise a sixth mode of operation and, during the sixth mode of operation, the delegation may be such that a fleet operator may be configured to control a plurality of hybrid vehicles 100 and the objective of the hybrid vehicle 100, and each hybrid vehicle 100, of the plurality of hybrid vehicles 100 (e.g. a processor and/or computing device of each respective hybrid vehicle 100, of the plurality of hybrid vehicles 100) may be configured to control the destination of the hybrid vehicle 100, the speed of the hybrid vehicle 100, the direction of travel of the hybrid vehicle 100, the type of locomotion of the hybrid vehicle 100, and the position of the plurality of leg-wheel components 102 of the hybrid vehicle 100.

A chart 400 illustrating a plurality of modes of operation of the hybrid vehicle 100 is shown, e.g., in FIG. 4, according to an exemplary embodiment of the present disclosure.

Chart 400 illustrates six example operation modes for a hybrid vehicle 100. As illustrated, various aspects of control for the hybrid vehicle 100 may be controlled by either an operator and/or the hybrid vehicle 100 itself, depending on the operation mode. In general, a number of aspects of the operation may be subject to different types of operator control. For example, aspects that may be controlled in operating the hybrid vehicle 100 may comprise one or more objectives of the hybrid vehicle 100 (e.g., reaching a destination within a timeframe, etc.), one or more destinations of the hybrid vehicle 100 (e.g., locations with road access, locations without road access, locations being positioned on level terrain, unlevel terrain, rocky terrain, wet terrain, etc.), a speed and direction of travel, a type of locomotion used (e.g., wheeled, walking, and/or a combination), a position of one or more leg-wheel components 102 when in walking locomotion, controlling the walking gait when in walking locomotion, etc. Moreover, in controlling the operation of the hybrid vehicle 100, different vehicle operation modes are described that may afford different types of operation to the hybrid vehicle 100 operator. In general, the vehicle operation modes may be configured to cover modes in which an onboard operator is in complete control of vehicle operation to modes in which an operator (onboard or remote) may provide the hybrid vehicle 100 with objectives that the hybrid vehicle 100 may interpret, which the hybrid vehicle 100 may then implement to accomplish the objectives. According to an exemplary embodiment, a selection of operation mode may be based on one or more objectives of the hybrid vehicle 100 (e.g., reaching a destination within a timeframe, etc.), one or more destinations of the hybrid vehicle 100 (e.g., locations with road access, locations without road access, locations being positioned on level terrain, unlevel terrain, rocky terrain, wet terrain, etc.), a speed and direction of travel, a type of locomotion used (e.g., wheeled, walking, and/or a combination), and/or other suitable factors for selecting an operation mode.

According to an exemplary embodiment, in a first vehicle operation mode, illustrated as Operation Mode 1, an operator may be provided with complete control of operation(s) of the hybrid vehicle 100. In such a mode, the operator may be in control of the type of locomotion used, and may select between wheeled locomotion, walking locomotion, and/or a combination of wheeled and walking locomotion. According to an exemplary embodiment, the operator may control a position of each wheel by either setting the individual joint positions, or by specifying the trajectory and position of the wheel. For example, in the first operation mode, the operator may have full freedom to select the stance and position of each leg.

According to an exemplary embodiment, in a second vehicle operation mode, illustrated as Operation Mode 2, the operator may be provided with a standard manual control of the hybrid vehicle 100. The operator may be in control of a direction and path of travel, as well as a speed of the hybrid vehicle 100. The operator may be in control of a type of locomotion used and may select between wheeled locomotion, walking locomotion, and/or a combination of wheeled and walking locomotion. Based at least on the user control of the type of locomotion, the hybrid vehicle 100 may be configured to automatically determine one or more joint positions in the leg-wheel components. The leg-wheel components may have different walking modes under the control of the operator. In addition to walking locomotion and rolling locomotion, the wheel motors may be configured to be used while walking to create a hybrid wheeled-walking mode of locomotion. Under walking locomotion, the motors may drive the wheels. Under rolling locomotion, the leg-wheel components may operate as a high range of motion suspension.

According to an exemplary embodiment, in a third vehicle operation mode, illustrated as Operation Mode 3, the operator may be provided with an automatic control of the hybrid vehicle 100. The operator may be in control of a direction and path of travel of the hybrid vehicle 100, as well as a speed of the hybrid vehicle 100. The operator may also be provided with control of a body attitude range (e.g., pitch and roll limits of the chassis) of the hybrid vehicle 100. Given a body attitude range as set by the operator, the hybrid vehicle may be configured to select between wheeled locomotion, walking locomotion (e.g., vehicle gait), and/or a combination of wheeled and walking locomotion. Based on the type of locomotion, the hybrid vehicle 100 may be configured to automatically determine one or more joint positions in the leg-wheel components. The leg-wheel components (e.g., leg-wheel components 102) may have different walking modes under the control of the operator. In addition to walking locomotion and rolling locomotion, the wheel motors may be configured to be used while walking to create a hybrid wheeled-walking mode of locomotion. Under walking locomotion, the motors may be configured to drive the wheels. Under rolling locomotion, the leg-wheel components may be configured to operate as a high range of motion suspension.

According to an exemplary embodiment, in a fourth vehicle operation mode, illustrated as Operation Mode 4, the operator may be provided with supervised autonomy of the hybrid vehicle 100. The operator may be in control of the destination of the hybrid vehicle 100. According to an exemplary embodiment, the operator may also able to control various path optimizations and rider experience configurations, such as, e.g., shortest time of travel, least energy expenditure, body attitude limits, etc. Based at least on the destination as set by the operator, and optionally based on any path optimization and rider experience configurations, the hybrid vehicle 100 may be configured to select a direction and path of travel, as well as a speed of the hybrid vehicle 100. The hybrid vehicle 100 may be configured to select between wheeled locomotion, walking locomotion (e.g., vehicle gait), and/or a combination of wheeled and walking locomotion, based on, e.g., a destination and path of travel of the hybrid vehicle 100. Based on the type of locomotion, the hybrid vehicle 100 may be configured to automatically determine joint positions in the leg-wheel components. The leg-wheel components may have different walking modes under the control of the operator. In addition to walking locomotion and rolling locomotion, the wheel motors may be configured to be used while walking to create a hybrid wheeled-walking mode of locomotion. According to an exemplary embodiment, under walking locomotion, the motors may be configured to drive the wheels. According to an exemplary embodiment, under rolling locomotion, the leg-wheel components may be configured to operate as a high range of motion suspension.

According to an exemplary embodiment, in a fifth vehicle operation mode, illustrated as Operation Mode 5, the operator may be provided with collaborative autonomy control of the hybrid vehicle 100. The operator may be in control of the of the mission objectives for the hybrid vehicle 100 and may provide the objectives to the hybrid vehicle 100 (e.g., through a user interface). The operator may issue commands to the hybrid vehicle 100 as needed. According to an exemplary embodiment, the hybrid vehicle 100 may be configured to interpret the objectives received as commands and may be configured to implement these commands to accomplish the mission. According to an exemplary embodiment, the hybrid vehicle 100 may be configured to select appropriate locomotion priorities (e.g., speed, battery, wear) and acquire appropriate information (e.g., mapping data) and automatically and dynamically adjust specific operating points. Based at least on the objectives as set by the operator, the hybrid vehicle 100 may be configured to select a direction and path of travel, as well as a speed of the hybrid vehicle 100. The hybrid vehicle 100 may be configured to select between wheeled locomotion, walking locomotion (e.g., vehicle gait), and/or a combination of wheeled and walking locomotion based on the destination and the path of travel, based on the objectives and locomotion priorities and other appropriate information. Based on the type of locomotion, the hybrid vehicle 100 may be configured to automatically determine joint positions in the leg-wheel components. The leg-wheel components may have different walking modes under the control of the operator. In addition to walking locomotion and rolling locomotion, the wheel motors may be configured to be used while walking to create a hybrid wheeled-walking mode of locomotion. According to an exemplary embodiment, under walking locomotion, the motors may be configured to drive the wheels. According to an exemplary embodiment, under rolling locomotion, the leg-wheel components may be configured to operate as a high range of motion suspension.

According to an exemplary embodiment, in a sixth vehicle operation mode, illustrated as Operation Mode 6, the hybrid vehicle 100 may be configured to be controlled collectively amongst a fleet of hybrid vehicles 100. A fleet operator may be in control of the of the mission objectives for the hybrid vehicle 100 and may provide the objectives to the hybrid vehicle 100 (e.g., through a remote interface). The objectives may comprise, e.g., multiple destinations and/or situational objectives to be accomplished by the fleet of hybrid vehicles 100. The fleet operator may issue commands and orders to one hybrid vehicle 100, groups of hybrid vehicles 100, and/or all hybrid vehicles 100 of the fleet as needed. According to an exemplary embodiment, the hybrid vehicle 100 may be configured to interpret the objectives received as commands and/or orders and may be configured to implement these commands and/or orders to accomplish the mission. According to an exemplary embodiment, the hybrid vehicle 100 may be configured to select appropriate locomotion priorities (e.g., speed, battery, wear) and acquire appropriate information (e.g., mapping data) and automatically and dynamically adjust specific operating points. Based at least on the objectives as set by the operator, the hybrid vehicle 100 may be configured to select a direction and path of travel, as well as a speed of the hybrid vehicle 100. According to an exemplary embodiment, the hybrid vehicle 100 may be configured to select between wheeled locomotion, walking locomotion (e.g., vehicle gait), and/or a combination of wheeled and walking locomotion based on the destination and the path of travel, based on the objectives and locomotion priorities and other appropriate information. Based on the type of locomotion, the hybrid vehicle 100 may be configured to automatically determine joint positions in the leg-wheel components. The leg-wheel components may have different walking modes under the control of the operator. In addition to walking locomotion and rolling locomotion, the wheel motors may be configured to be used while walking to create a hybrid wheeled-walking mode of locomotion. According to an exemplary embodiment, under walking locomotion, the motors may be configured to drive the wheels. According to an exemplary embodiment, under rolling locomotion, the leg-wheel components may be configured to operate as a high range of motion suspension.

Figure 2A:
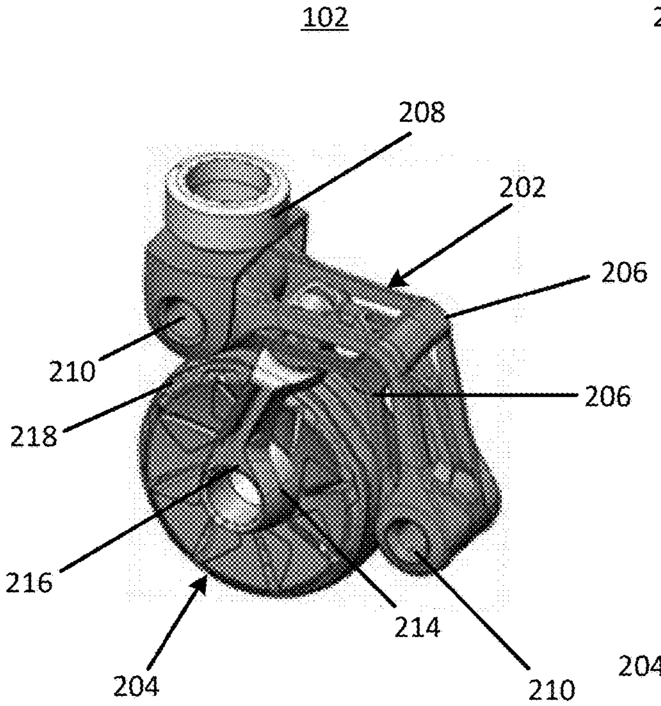
FIGS. 2A and 2B illustrate a leg-wheel component in retracted and extended positions, according to an exemplary embodiment of the present disclosure.
Figure 2B:
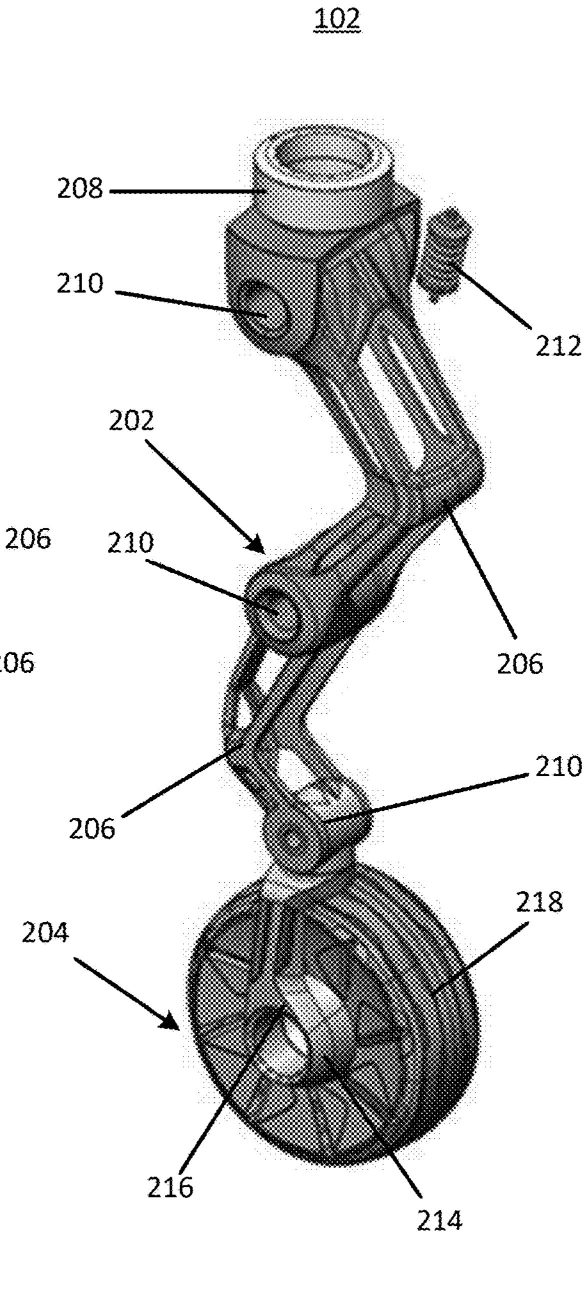

Referring now to FIGS. 2A and 2B, an example leg-wheel component 102 in a retracted position (FIG. 2A) and an extended position (FIG. 2B), are illustratively depicted, in accordance with an exemplary embodiment of the present disclosure.

Various embodiments of such leg-wheel components 102 are described. e.g., in co-pending U.S. patent application Ser. No. 16/734,310 (U.S. Patent Application Publication No. 2020/0216127). It is noted that other configurations of one or more leg-wheel components 102 may be incorporated into the present disclosure, while maintaining the spirit and functionality of the present disclosure.

The leg-wheel component 102 may comprise a leg component 202 and a wheel component 204. The wheel component 204 may be coupled to the leg component 202.

According to an exemplary embodiment, the leg-wheel component 102 may comprise a coupling component 208 configured to couple the leg-wheel component 102 to the body 104, frame, or other suitable component of the hybrid vehicle 100.

The leg component 202 may be divided into one or more segments 206. The one or more segments 206, coupling component 208, and/or the wheel component 204 may be configured to rotate about each other via one or more movable joint components 210. According to an exemplary embodiment, the leg-wheel component 102 may comprise one or more suspension systems 212 (e.g., springs, shock absorbers, etc).

According to an exemplary embodiment, the wheel component 204 may be configured to rotate along an axis while coupled to the leg component 202, enabling the hybrid vehicle 100 to move along a surface in contact with the wheel component 204. According to an exemplary embodiment, the leg-wheel component 102 may comprise one or more braking mechanisms for preventing and/or decreasing rotation of the wheel component 204.

With reference to FIG. 2A, the leg-wheel component 102 (a hybrid vehicle 100 traversal component) is in a retracted state, with the leg-wheel component 102 being configured and positioned to provide wheeled locomotion. With reference to FIG. 2B, the leg-wheel component 102 is in an extended state, with the leg-wheel component 102 being configured and positioned to provide walking locomotion and/or wheeled locomotion.

According to an exemplary embodiment, wheeled locomotion may be available for use in situations where traditional vehicle travel using rolling wheels 204 is available (e.g., roads and highways). Wheeled locomotion is efficient, when available, for conveyance of a vehicle (e.g., hybrid vehicles 100, 300) between destinations. According to some exemplary embodiments, the leg-wheel components 102 may be configured to allow for active height adjustment of the hybrid vehicle 100, enabling the hybrid vehicle 100 to go, e.g., from street use to off-road use.

In walking locomotion, the hybrid vehicle 100 may be configured to walk up elevations and terrain that is not surmountable using wheeled locomotion. In some instances, walking locomotion allows for nimble and quiet motion, relative to wheeled locomotion. The hybrid vehicle 100 may also be configured to move laterally, allowing for quadrupedal ambulation.

According to an exemplary embodiment, the leg-wheel component 102 comprises one or more in-wheel motors 214 configured to power movement of the wheel component 204 and/or the leg component 202. The use of in-wheel motors 214 frees the suspension 212 from traditional axles and allows for ambulation, but also increases the driving performance and adaptability.

By using the wheels 204 as feet, the electric motors 214 may be configured to lock for stable ambulation, but also may have slow torque controlled rotation for micro movements when climbing or during self-recovery. According to some exemplary embodiments, the wheel 204 of the leg-wheel component 102 may be configured to rotate 180 degrees perpendicular to a hub 216, not only allowing leaning capability while driving, but also giving the wheels 204 enhanced positioning potential when a tire 218 is locked and in walking mode. The wheel 204 may be configured to turn 90 degrees and even may be configured to be used as a wide foot pad, lowering the hybrid vehicle's 100 pounds per square inch (PSI) footprint when walking over loose materials or fragile surfaces, similar to that of a snowshoe.

Figure 2C:
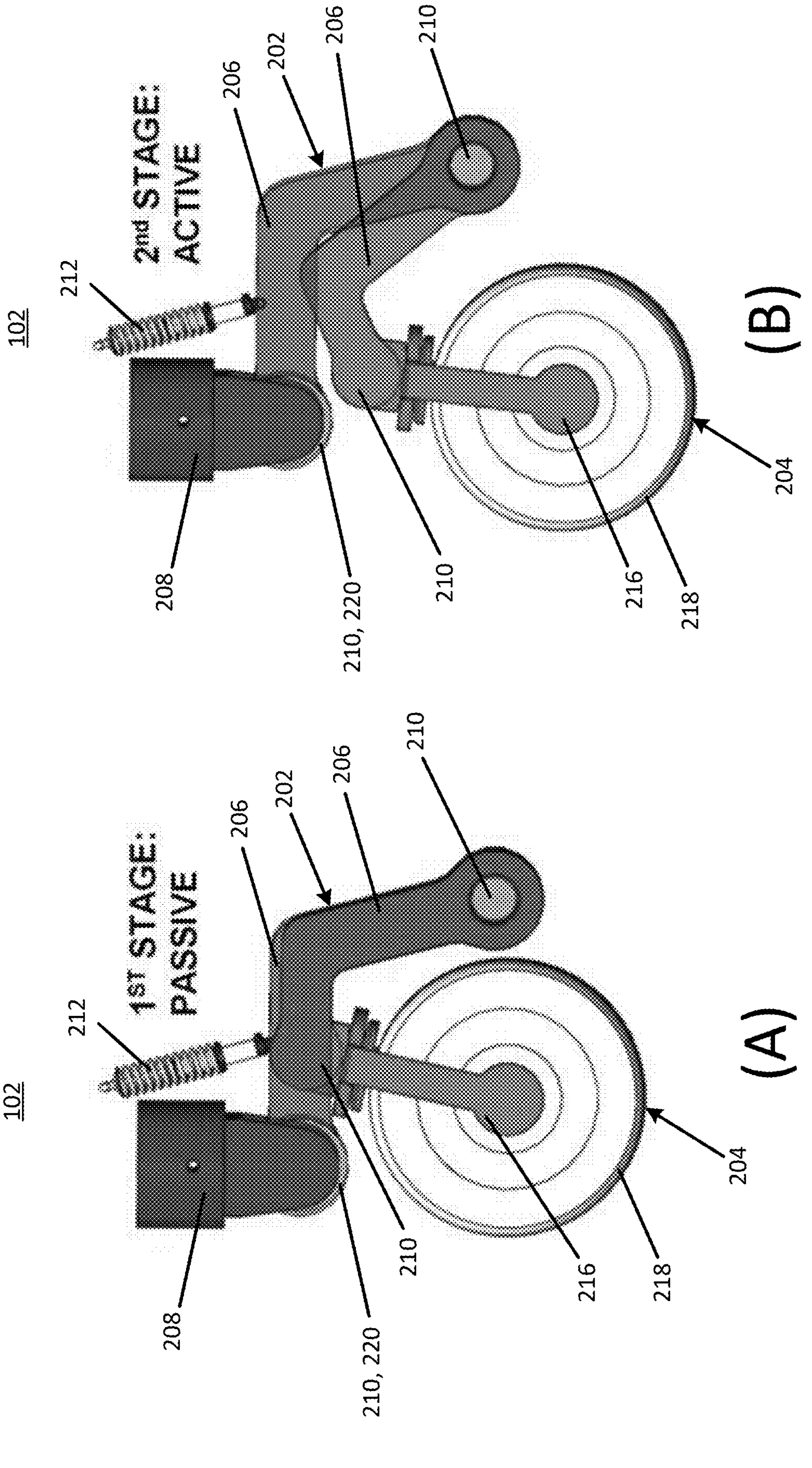
FIG. 2C is a diagram illustrating a low range of motion suspension stage and a high range of motion suspension stage, according to an exemplary embodiment of the present disclosure.

Referring now to FIG. 2C, a diagram indicating a low range of motion suspension stage ((A), a passive stage), and a high range of motion suspension stage ((B), an active stage) of a leg-wheel component 102 is illustratively depicted, in accordance with an exemplary embodiment of the present disclosure.

A hybrid vehicle (e.g., 100, 300) traversal component (also referred to herein as a "leg-wheel component" 102 is provided. According to an exemplary embodiment, the leg-wheel component 102 may be configured to provide two-stage suspension: a first, low range of motion suspension stage, when the hybrid vehicle 100 leg-wheel component 102 is in a retracted position (A), and a second, high range of motion suspension stage, when the hybrid vehicle 100 leg-wheel component 102 is in an extended position (B).

According to an exemplary embodiment, in the low range of motion suspension stage, a suspension system 212 (e.g., a coil-over suspension) is utilized and engaged when the hybrid vehicle 100 leg-wheel component 102 is in the retracted position. According to an exemplary embodiment, while in the low range of motion suspension stage, the knee joint component 220 of the leg-wheel component 102 may be relaxed, while the remaining joints 210 of the leg-wheel component 102 may be locked. During the low range of motion suspension stage, the leg-wheel component 102 may be configured to handle high-frequency vibrations through the chassis-mounted suspension system 212. According to an exemplary embodiment, when the leg-wheel component 102 is retracted and the low range of motion suspension stage is enabled, the hybrid vehicle 100 may be configured to provide 0 to 5 inches of suspension during wheeled locomotion. It is noted, however, that other amounts of suspension may be incorporated while maintaining the spirit and functionality of the present disclosure.

According to an exemplary embodiment, in the high range of motion suspension stage, the suspension system 212 (e.g., the coil-over suspension) may be disengaged when the leg-wheel component 102 is in an extended or actuated position. For example, the suspension system 212 may be configured to remain with the chassis during the high range of motion suspension stage, and the knee joint 220 may be driven by a motor in order to provide suspension. According to an exemplary embodiment, during the high range of motion suspension stage, the leg-wheel component 102 may be configured to support advanced driving dynamics through the capabilities of a motor at the knee joint 220. According to an exemplary embodiment, when the leg-wheel component 102 is extended and the high range of motion suspension stage is enabled, the hybrid vehicle 100 may be configured to provide 5 to 50 inches of suspension during walking locomotion. It is noted, however, that other amounts of suspension may be incorporated while maintaining the spirit and functionality of the present disclosure.

Figure 3A:
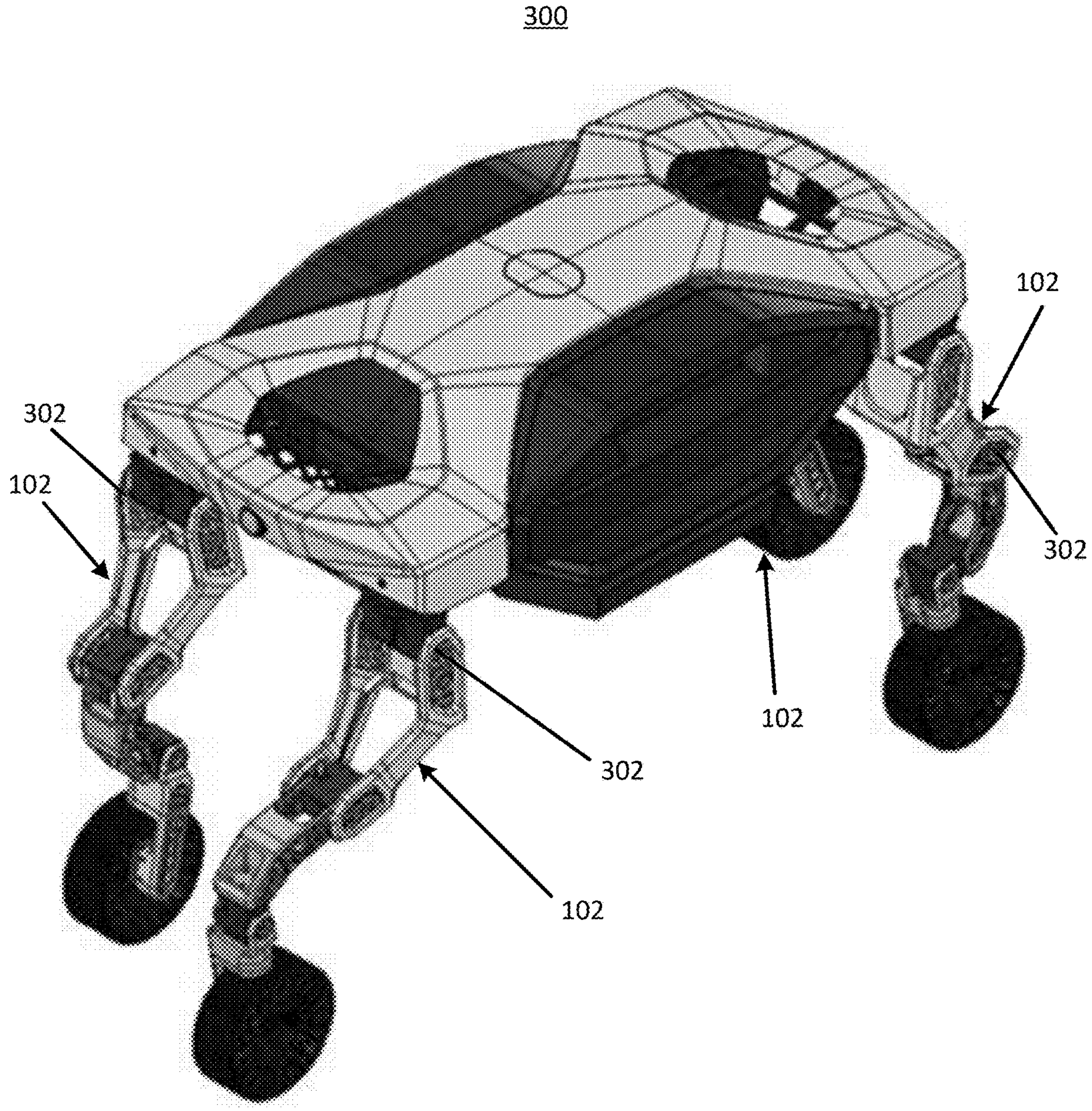
FIGS. 3A through 3C illustrate perspective views of different walking gaits of a hybrid vehicle, according to exemplary embodiments of the present disclosure.
Figure 3B:
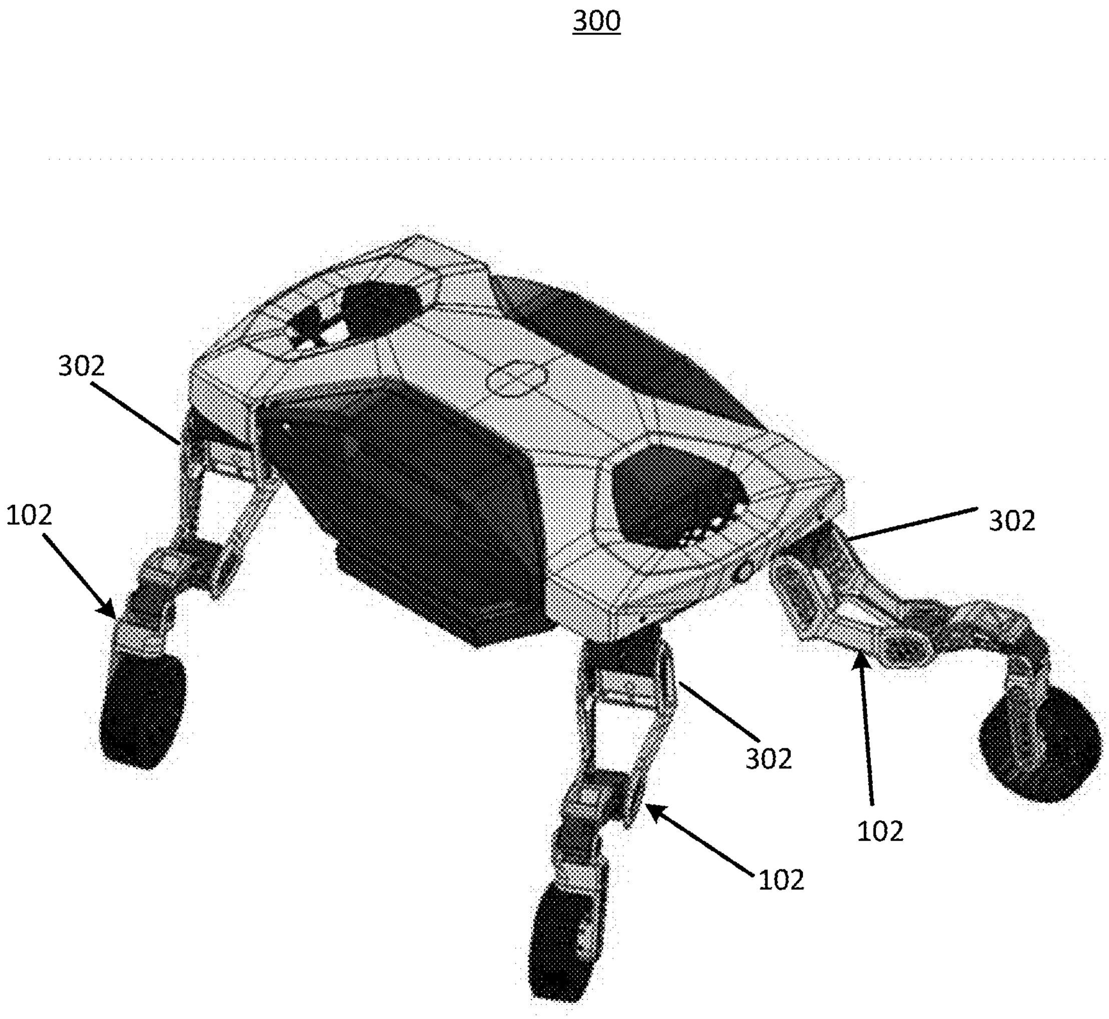
Figure 3C:
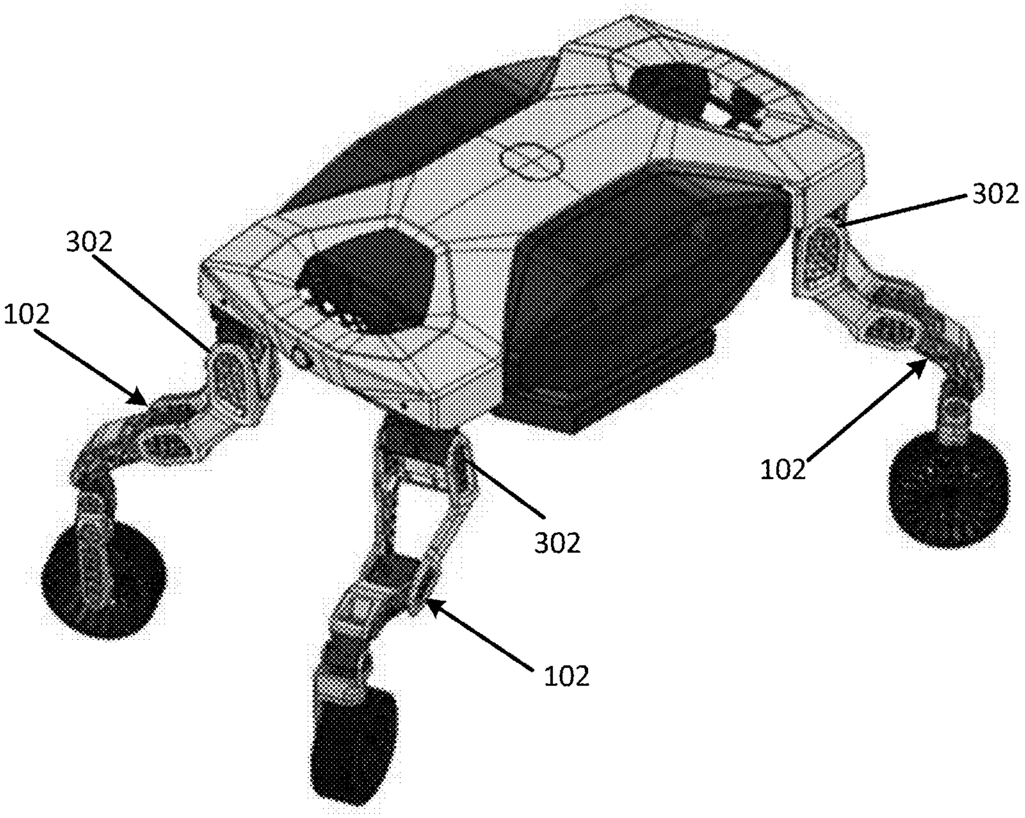

Referring now to FIGS. 3A through 3C, perspective views of different walking gaits of a hybrid vehicle 300 are illustratively depicted, in accordance with exemplary embodiments of the present disclosure.

FIG. 3A illustrates an example view of a hybrid vehicle 300 operating in a mammalian walking gait, according to an exemplary embodiment of the present disclosure. According to an exemplary embodiment, while in a mammalian walking gait, the leg-wheel components 102 are positioned in a support position below a hip section 302, allowing more of the reaction force to translate axially through each link rather than in shear load. In this position, each leg-wheel component 102 may function closer to a singularity, meaning that, for a given change in a joint 210 angle, an end effector will move relatively little. This results in a relatively energy efficient gait which is well suited for moderate terrain over longer periods of time, but may not be as stable because of the narrower stance of the hybrid vehicle 300.

FIG. 3B illustrates an example view of a hybrid vehicle 300 operating in a reptilian walking gait, according to an exemplary embodiment of the present disclosure. According to an exemplary embodiment, a reptilian walking gait may be configured to generally mirror how animals such as a lizard or gecko might traverse terrain. In this position, the reptilian walking gait may rely more heavily on one or more hip abduction motors which may be configured to swing the leg-wheel components 102 around a vertical axis, maintaining a wider stance. The reptilian gait position results in a higher level of stability and control over movement, but is less energy efficient. The wide stance results in high static loads on each motor, making the reptilian gait best suited for walking across extremely unpredictable, rugged terrain for short periods of time.

FIG. 3C illustrates an example view of a hybrid vehicle 300 operating in a hybrid walking gait, according to an exemplary embodiment of the present disclosure. In addition to reptilian and mammalian gaits, a variety of variants combining various gait strategies are possible. These variants may be generated through optimization techniques and/or discovered through simulation and machine learning. These hybrid gaits allow the hybrid vehicle 300 to optimize around the strengths and weaknesses of the more static bio-inspired gaits, transitioning to a more mammalian-style gait when terrain is gentler and to a more reptilian-style gait in extremely rugged and/or dynamic environments. In dynamic and highly variable terrains, the hybrid vehicle 300 may be configured to constantly adjust its gait based on the environment, battery charge, and/or any number of other factors.

In accordance with the described embodiments, wheeled locomotion may be available for use in situations where traditional vehicle travel using rolling wheels is available (e.g., roads and highways). Wheeled locomotion is efficient, when available, for conveyance of a hybrid vehicle (e.g., hybrid vehicles 100, 300) between destinations. In some embodiments, the leg-wheel components 102 may be configured to allow for active height adjustment of the hybrid vehicle when transitioning from street use to off-road use.

In walking locomotion, the hybrid vehicle may be configured to walk up elevations and terrain that may not be surmountable using wheeled locomotion. In some instances, walking locomotion may allows for nimble and quiet motion, relative to wheeled locomotion. The hybrid vehicle may also be capable of moving laterally, allowing for quadrupedal ambulation.

Referring now to FIG. 5, an illustration of an example architecture for a computing device 500 is provided.

According to an exemplary embodiment, one or more functions of the present disclosure may be implemented by a computing device such as, e.g., computing device 500 or a computing device similar to computing device 500.

The hardware architecture of FIG. 5 represents one example implementation of a representative computing device configured to perform one or more methods and means for controlling a vehicle capable of locomotion using both walking motion and rolling traction, as described herein. As such, the computing device 500 of FIG. 5 implements at least a portion of the method(s) described herein and/or implements at least a portion of the functions of the system(s) described herein (e.g., vehicle 100, 300).

Some or all components of the computing device 500 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 7, the computing device 500 may comprise a user interface 502, a Central Processing Unit ("CPU") 506, a system bus 510, a memory 512 connected to and accessible by other portions of computing device 500 through system bus 510, and hardware entities 514 connected to system bus 510. The user interface may comprise input devices and output devices, which may be configured to facilitate user-software interactions for controlling operations of the computing device 500. The input devices may comprise, but are not limited to, a physical and/or touch keyboard 540. The input devices may be connected to the computing device 500 via a wired or wireless connection (e.g., a Bluetooth® connection). The output devices may comprise, but are not limited to, a speaker 542, a display 544, and/or light emitting diodes 546.

At least some of the hardware entities 514 may be configured to perform actions involving access to and use of memory 512, which may be a Random Access Memory (RAM), a disk driver and/or a Compact Disc Read Only Memory (CD-ROM), among other suitable memory types. Hardware entities 514 may comprise a disk drive unit 516 comprising a computer-readable storage medium 518 on which may be stored one or more sets of instructions 520 (e.g., programming instructions such as, but not limited to, software code) configured to implement one or more of the methodologies, procedures, or functions described herein. The instructions 520 may also reside, completely or at least partially, within the memory 512 and/or within the CPU 506 during execution thereof by the computing device 500.

The memory 512 and the CPU 506 may also constitute machine-readable media. The term "machine-readable media", as used here, refers to a single medium or multiple media (e.g., a centralized or distributed database, and/or associated caches and servers) that store the one or more sets of instructions 520. The term "machine-readable media," as used here, also refers to any medium that is capable of storing, encoding or carrying a set of instructions 520 for execution by the computing device 500 and that cause the computing device 500 to perform any one or more of the methodologies of the present disclosure.

Figure 6:
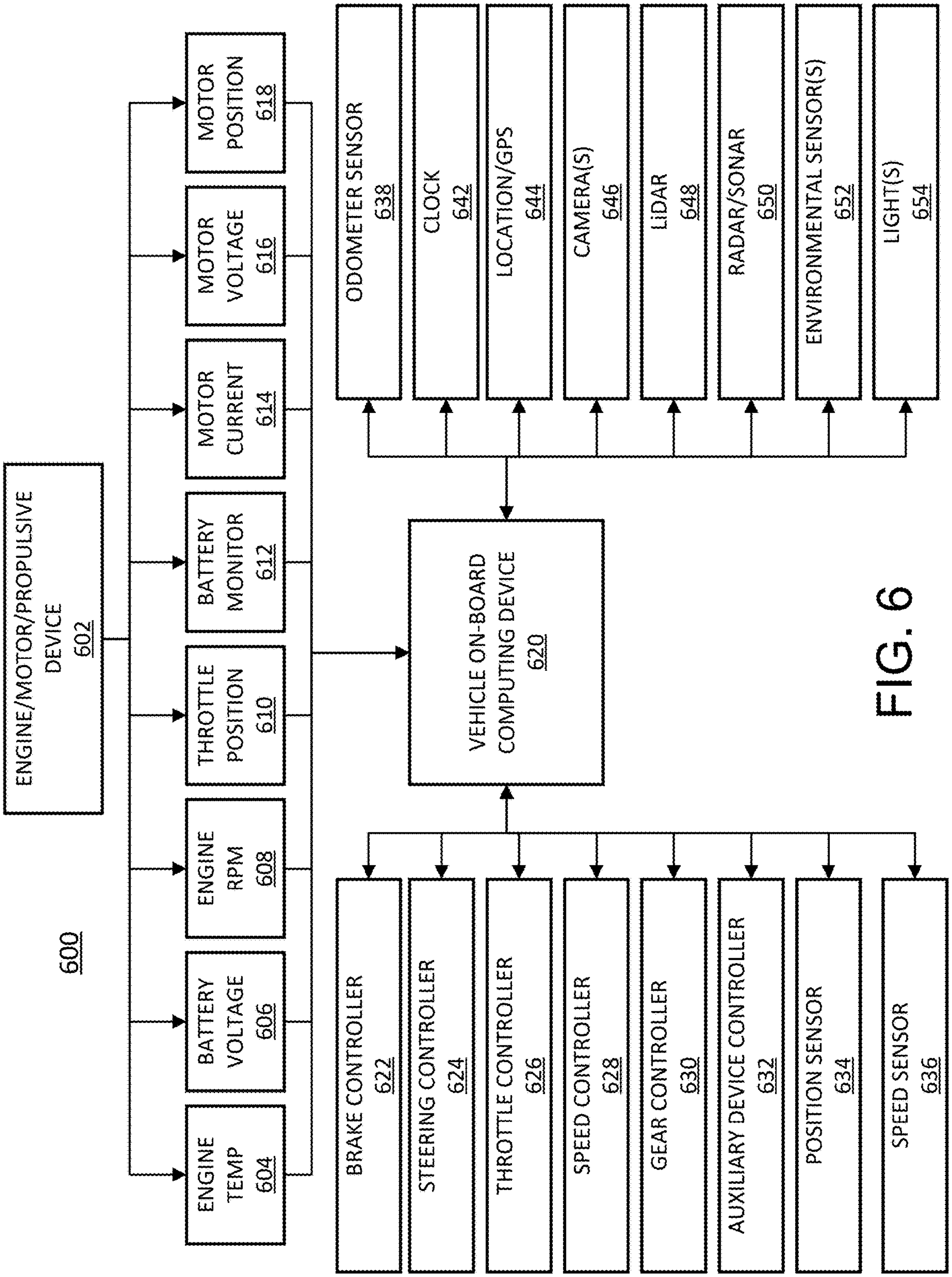
FIG. 6 illustrates an example architecture of a vehicle, according to an exemplary embodiment of the present disclosure.

Referring now to FIG. 6, an example vehicle system architecture 600 for a vehicle is provided, in accordance with an exemplary embodiment of the present disclosure.

Hybrid vehicles 100, 300 may have the same or similar system architecture as that shown in FIG. 6. Thus, the following discussion of vehicle system architecture 600 is sufficient for understanding one or more components of hybrid vehicles 100, 300.

As shown in FIG. 6, the vehicle system architecture 600 may comprise an engine, motor or propulsive device (e.g., a thruster) 602 and various sensors 604-618 for measuring various parameters of the vehicle system architecture 600. In gas-powered or hybrid vehicles having a fuel-powered engine, the sensors 604-618 may comprise, for example, an engine temperature sensor 604, a battery voltage sensor 606, an engine Rotations Per Minute (RPM) sensor 608, and/or a throttle position sensor 610. If the vehicle is an electric or hybrid vehicle, then the vehicle may comprise an electric motor, and accordingly may comprise sensors such as a battery monitoring system 612 (to measure current, voltage and/or temperature of the battery), motor current 614 and voltage 616 sensors, and motor position sensors such as resolvers and encoders 618.

Operational parameter sensors that are common to both types of vehicles may comprise, for example: a position sensor 634 such as an accelerometer, gyroscope and/or inertial measurement unit; a speed sensor 636; and/or an odometer sensor 638. The vehicle system architecture 600 also may comprise a clock 642 that the system uses to determine vehicle time and/or date during operation. The clock 642 may be encoded into the vehicle on-board computing device 620, it may be a separate device, or multiple clocks may be available.

The vehicle system architecture 600 also may comprise various sensors that operate to gather information about the environment in which the vehicle is traveling. These sensors may comprise, for example: a location sensor 644 (for example, a Global Positioning System (GPS) device); object detection sensors such as one or more cameras 646; a LiDAR sensor system 648; and/or a RADAR and/or a sonar system 650. The sensors also may comprise environmental sensors 652 such as, e.g., a humidity sensor, a precipitation sensor, a light sensor, and/or ambient temperature sensor. The object detection sensors may be configured to enable the vehicle system architecture 600 to detect objects that are within a given distance range of the vehicle in any direction, while the environmental sensors 652 may be configured to collect data about environmental conditions within the vehicle's area of travel. According to an exemplary embodiment, the vehicle system architecture 600 may comprise one or more lights 654 (e.g., headlights, flood lights, flashlights, etc.).

During operations, information may be communicated from the sensors to an on-board computing device 620 (e.g., computing device 500 of FIG. 7). The on-board computing device 620 may be configured to analyze the data captured by the sensors and/or data received from data providers and may be configured to optionally control operations of the vehicle system architecture 600 based on results of the analysis. For example, the on-board computing device 620 may be configured to control: braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers. The brake controller 622 may comprise a pedal effort sensor, pedal effort sensor, and/or simulator temperature sensor, as described herein.

Geographic location information may be communicated from the location sensor 644 to the on-board computing device 620, which may then access a map of the environment that corresponds to the location information to determine known fixed features of the environment such as streets, buildings, stop signs and/or stop/go signals. Captured images from the cameras 646 and/or object detection information captured from sensors such as LiDAR 648 may be communicated from those sensors to the on-board computing device 620. The object detection information and/or captured images may be processed by the on-board computing device 620 to detect objects in proximity to the vehicle. Any known or to be known technique for making an object detection based on sensor data and/or captured images may be used in the embodiments disclosed in this document.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A hybrid vehicle, comprising:
- a processor;
- a chassis; and
- a plurality of leg-wheel components coupled to the chassis, wherein:
- the plurality of leg-wheel components are configured to be collectively operable to provide wheeled locomotion and walking locomotion,
- the processor is configured to cause the hybrid vehicle to function in one or more of a plurality of modes of operation, and
- one or more modes of operation, in the plurality of modes of operation, is configured to delegate control of an operation of at least one aspect of the hybrid vehicle between an operator and the processor;

wherein the at least one aspect of the hybrid vehicle comprises one or more of the following:
- an objective of the hybrid vehicle;
- a destination of the hybrid vehicle;
- a speed of the hybrid vehicle:
- a direction of travel of the hybrid vehicle;
- a type of locomotion of the hybrid vehicle; or
- a position of the plurality of leg-wheel components of the hybrid vehicle;

wherein the plurality of modes of operation comprises a sixth mode of operation; and wherein, during the sixth mode of operation, a fleet operator controls:
- a plurality of hybrid vehicles, wherein each of the plurality of hybrid vehicles are configured to be capable of wheeled and walking motion; and
- the objective of the hybrid vehicle.

2. The hybrid vehicle of claim 1 wherein two or more modes of operation are configured to delegate control of an operation of at least one aspect of the hybrid vehicle between an operator and the processor.

3. The hybrid vehicle of claim 1 wherein each mode of operation is configured to delegate control of an operation of at least one aspect of the hybrid vehicle between an operator and the processor.

4. The hybrid vehicle of claim 1, wherein:

the plurality of modes of operation comprises a first mode of operation, and during the first mode of operation, the operator controls:
- the objective of the hybrid vehicle;
- the destination of the hybrid vehicle;
- the speed of the hybrid vehicle;
- the direction of travel of the hybrid vehicle;
- the type of locomotion of the hybrid vehicle; and
- the position of the plurality of leg-wheel components of the hybrid vehicle.

5. The hybrid vehicle of claim 1, wherein:

the plurality of modes of operation comprises a second mode of operation, and during the second mode of operation:
- the operator controls:
  - the objective of the hybrid vehicle;
  - the destination of the hybrid vehicle;
  - the speed of the hybrid vehicle;

the direction of travel of the hybrid vehicle; and
the type of locomotion of the hybrid vehicle, and
the processor controls:
the position of the plurality of leg-wheel components of the hybrid vehicle.

6. The hybrid vehicle of claim 1, wherein:
the plurality of modes of operation comprises a third mode of operation, and
during the third mode of operation:
the operator controls:
the objective of the hybrid vehicle;
the destination of the hybrid vehicle;
the speed of the hybrid vehicle; and
the direction of travel of the hybrid vehicle, and
the processor controls:
the type of locomotion of the hybrid vehicle; and
the position of the plurality of leg-wheel components of the hybrid vehicle.

7. The hybrid vehicle of claim 1, wherein:
the plurality of modes of operation comprises a fourth mode of operation, and
during the fourth mode of operation:
the operator controls:
the objective of the hybrid vehicle; and
the destination of the hybrid vehicle, and
the processor controls:
the speed of the hybrid vehicle;
the direction of travel of the hybrid vehicle;
the type of locomotion of the hybrid vehicle; and
the position of the plurality of leg-wheel components of the hybrid vehicle.

8. The hybrid vehicle of claim 1, wherein:
the plurality of modes of operation comprises a fifth mode of operation, and
during the fifth mode of operation:
the operator controls:
the objective of the hybrid vehicle, and
the processor controls:
the destination of the hybrid vehicle;
the speed of the hybrid vehicle;
the direction of travel of the hybrid vehicle;
the type of locomotion of the hybrid vehicle; and
the position of the plurality of leg-wheel components of the hybrid vehicle.

9. The hybrid vehicle of claim 4, wherein
a processor of each hybrid vehicle, of the plurality of hybrid vehicles, controls, for its respective hybrid vehicle:
the destination of the hybrid vehicle;
the speed of the hybrid vehicle;
the direction of travel of the hybrid vehicle;
the type of locomotion of the hybrid vehicle; and
the position of the plurality of leg-wheel components of the hybrid vehicle.

10. A system for controlling a hybrid vehicle, comprising:
a hybrid vehicle, comprising:
a chassis; and
a plurality of leg-wheel components coupled to the chassis, wherein the plurality of leg-wheel components are configured to be collectively operable to provide wheeled locomotion and walking locomotion; and
a computing device comprising a processor and a memory, wherein the memory is configured to store programming instructions that, when executed by the processor, cause the processor to:
cause the hybrid vehicle to function in one or more of a plurality of modes of operation, wherein one or more modes of operation, in the plurality of modes of operation, delegate control of an operation of at least one aspect of the hybrid vehicle between an operator and the hybrid vehicle;
wherein each mode of operation is configured to delegate control of an operation of at least one aspect of the hybrid vehicle between an operator and the processor;
wherein the plurality of modes of operation comprises a sixth mode of operation; and
wherein, during the sixth mode of operation, a fleet operator controls,
a plurality of hybrid vehicles, wherein each of the plurality of hybrid vehicles are configured to be capable of wheeled and walking motion; and
the objective of the hybrid vehicle.

11. The system of claim 10, wherein the at least one aspect of the hybrid vehicle comprises one or more of the following:
an objective of the hybrid vehicle;
a destination of the hybrid vehicle;
a speed of the hybrid vehicle;
a direction of travel of the hybrid vehicle;
a type of locomotion of the hybrid vehicle; and
a position of the plurality of leg-wheel components of the hybrid vehicle.

12. The system of claim 10, wherein:
the plurality of modes of operation comprises a first mode of operation, and
during the first mode of operation, the operator controls:
the objective of the hybrid vehicle;
the destination of the hybrid vehicle;
the speed of the hybrid vehicle;
the direction of travel of the hybrid vehicle;
the type of locomotion of the hybrid vehicle; and
a position of the plurality of leg-wheel components of the hybrid vehicle.

13. The system of claim 10, wherein:
the plurality of modes of operation comprises a second mode of operation, and
during the second mode of operation:
the operator controls:
the objective of the hybrid vehicle;
the destination of the hybrid vehicle;
the speed of the hybrid vehicle;
the direction of travel of the hybrid vehicle; and
the type of locomotion of the hybrid vehicle, and
the hybrid vehicle controls:
a position of the plurality of leg-wheel components of the hybrid vehicle.

14. The system of claim 10, wherein:
the plurality of modes of operation comprises a third mode of operation, and
during the third mode of operation:
the operator controls:
the objective of the hybrid vehicle;
the destination of the hybrid vehicle;
the speed of the hybrid vehicle; and
the direction of travel of the hybrid vehicle, and
the hybrid vehicle controls:
the type of locomotion of the hybrid vehicle; and
a position of the plurality of leg-wheel components of the hybrid vehicle.

15. The system of claim 10, wherein:
the plurality of modes of operation comprises a fourth mode of operation, and
during the fourth mode of operation:
the operator controls:
the objective of the hybrid vehicle; and
the destination of the hybrid vehicle, and
the hybrid vehicle controls:
the speed of the hybrid vehicle;
the direction of travel of the hybrid vehicle;
the type of locomotion of the hybrid vehicle; and
a position of the plurality of leg-wheel components of the hybrid vehicle.

16. The system of claim 10, wherein:
the plurality of modes of operation comprises a fifth mode of operation, and
during the fifth mode of operation:
the operator controls:
the objective of the hybrid vehicle, and
the hybrid vehicle controls:
the destination of the hybrid vehicle;
the speed of the hybrid vehicle;
the direction of travel of the hybrid vehicle;
the type of locomotion of the hybrid vehicle; and
a position of the plurality of leg-wheel components of the hybrid vehicle.

17. The system of claim 10, wherein
each hybrid vehicle, of the plurality of hybrid vehicles, controls:
the destination of the hybrid vehicle;
the speed of the hybrid vehicle;
the direction of travel of the hybrid vehicle;
the type of locomotion of the hybrid vehicle; and
a position of the plurality of leg-wheel components of the hybrid vehicle.

18. A method for controlling a hybrid vehicle, comprising:
setting, using a processor, a mode of operation, of a plurality of modes of operation,
wherein:
each mode of operation, in the plurality of modes of operation, is configured to delegate control of an operation of at least one aspect of a hybrid vehicle between an operator and the hybrid vehicle, and
the hybrid vehicle comprises:
a chassis; and
a plurality of leg-wheel components coupled to the chassis, wherein the plurality of leg-wheel components are configured to be collectively operable to provide wheeled locomotion and walking locomotion; and
causing the hybrid vehicle to function in one or more of the plurality of modes of operation;
wherein the plurality of modes of operation comprises a sixth mode of operation; and
wherein, during the sixth mode of operation, a fleet operator controls:
a plurality of hybrid vehicles, wherein each of the plurality of hybrid vehicles are configured to be capable of wheeled and walking motion; and
the objective of the hybrid vehicle.

* * * * *